US009486898B2

(12) United States Patent
Zajac, Jr.

(10) Patent No.: US 9,486,898 B2
(45) Date of Patent: Nov. 8, 2016

(54) SLIDING HEAD LOCKING PIN CLAMP

(71) Applicant: Zaytran, Inc., Elyria, OH (US)

(72) Inventor: Theodore Stanley Zajac, Jr., Avon Lake, OH (US)

(73) Assignee: ZAYTRAN, INC., Elyria, OH (US)

( * ) Notice: Subject to any disclaimer, the term of this patent is extended or adjusted under 35 U.S.C. 154(b) by 0 days.

(21) Appl. No.: 14/717,523

(22) Filed: May 20, 2015

(65) Prior Publication Data

US 2015/0336242 A1 Nov. 26, 2015

Related U.S. Application Data

(60) Provisional application No. 62/001,235, filed on May 21, 2014.

(51) Int. Cl.

*B23Q 3/08* (2006.01)
*B25B 5/08* (2006.01)
*B25B 5/12* (2006.01)

(52) U.S. Cl.

CPC ............... *B25B 5/087* (2013.01); *B25B 5/122* (2013.01)

(58) Field of Classification Search

CPC combination set(s) only.
See application file for complete search history.

(56) References Cited

U.S. PATENT DOCUMENTS 7,370,856 B2 * 5/2008 Sawdon .................. B25B 5/062 269/27
7,516,948 B2 * 4/2009 McIntosh ................ B25B 5/062 269/27

(Continued)

*Primary Examiner* — Alvin Grant

(74) *Attorney, Agent, or Firm* — Eschweiler & Associates, LLC

(57) ABSTRACT

A sliding head locking pin clamp is provided having a housing with a housing bore extending axially therethrough along a first axis. An end cap has an end cap bore extending therethrough along the first axis, wherein the end cap is operably coupled to a first end of the housing. A shaft has a shaft bore extending through the shaft along the first axis, wherein an outer diameter of a first end of the shaft generally defines a first portion of a locating pin. The first portion of the locating pin is in axial sliding engagement with at least a first portion of the end cap bore. The shaft has a shaft hole extending radially through the shaft along a second axis, wherein the second axis is perpendicular to the first axis. The shaft further has a shaft guide rod generally fixedly positioned in the shaft hole. A piston is coupled to the shaft and is in sliding engagement with the housing bore to linearly translate the shaft between a first axial position and a second axial position along the first axis. A slider has a slider hole extending radially therethrough, wherein the shaft guide rod is in linear sliding engagement with the slider hole, therein providing a linear translation of the slider with respect to the shaft along the second axis between a first radial position and a second radial position. The slider has a rod member extending through a first end of shaft bore and comprising a tip having an engagement lip, wherein the tip of the rod member generally defines a second portion of the locating pin. A cam follower also extends radially from the slider. A cam block has a cam block bore extending into the cam block along the first axis, wherein the cam block comprises a cam channel defined in a sidewall of the cam block bore. A portion of the slider is configured to reside within the cam block bore and wherein the cam follower is in sliding engagement with the cam channel. In the first axial position and first radial position, the first and second portions of the locating pin are configured to pass through a locating hole of a workpiece. In the second axial position and second radial position, the rod member is configured to clamp the workpiece between the engagement lip and the end cap. The first radial position and second radial position are governed by the sliding engagement between the shaft guide rod and the slider hole, and the sliding engagement between the cam follower and the cam channel upon the linear translation of the shaft between the first axial position and second axial position.

18 Claims, 8 Drawing Sheets

(56) References Cited

U.S. PATENT DOCUMENTS

2005/0242483 A1* 11/2005 McIntosh ................ B25B 5/062 269/32
2006/0049565 A1* 3/2006 Petit ........................ B25B 5/087 269/32
2006/0125167 A1* 6/2006 Steele ..................... B25B 5/087 269/32
2007/0069439 A1* 3/2007 McIntosh ................ B25B 5/087 269/32
2009/0236785 A1* 9/2009 McIntosh ................ B25B 5/062 269/32
2010/0320664 A1* 12/2010 Kawakami ............. B23Q 3/082 269/32
2010/0327503 A1* 12/2010 Kawakami ............. B23Q 1/009 269/32
2011/0031670 A1* 2/2011 Kawakami ............. B23Q 1/009 269/32
2014/0103589 A1* 4/2014 McIntosh ................. B23Q 3/08 269/32

* cited by examiner

SLIDING HEAD LOCKING PIN CLAMP

REFERENCE TO RELATED APPLICATION

This application claims priority to and the benefit of U.S. Provisional Application Ser. No. 62/001,235 which was filed May 21, 2014, entitled "SLIDING HEAD LOCKING PIN CLAMP", the entirety of which is hereby incorporated by reference as if fully set forth herein.

FIELD

The present invention relates generally to clamping devices, and more particularly to a sliding-head pin clamp having a clamping mechanism configured to be positioned at four 90-degree-opposed positions, as well as a locking mechanism having a pilot-operated check valve integrated into a body of the pin clamp and configured to selectively retain the clamping mechanism in a clamped position.

BACKGROUND

Pneumatically operated clamps are used in a variety of industries for securing objects in a position for various purposes. In automobile manufacturing, for example, stamped metal body parts are assembled on a pallet, wherein various pre-fabricated individual initial components or other parts of an automobile body are positioned on the pallet and clamped in place. Once clamped, the individual initial components are welded together, therein generally defining the automobile body. A typical pallet has at least four clamping locations (e.g., one clamping location is assigned to each of four corners of the automobile body), wherein at least one pin clamp apparatus is precisely affixed to the pallet at each clamping location via a riser (e.g., a weldment having precise dimensions).

Accordingly, once clamped in place by the pin clamps, the precise positioning of the individual initial components of the automobile body is assured at an initial station along an assembly line, and subsequent positioning and welding of subsequent components to the automobile body can be further generally assured, assuming the pin clamp(s) retain their clamping force as the automobile body progresses along the assembly line. Once assembly of the automobile body is complete, the pin clamps release the automobile body from the pallet for subsequent assembly, such as for painting and final assembly.

Conventionally, the pallet is referenced at a hardened steel position on the pallet, and the risers (and associated pin clamps) are further referenced to the hardened steel position. Typically, the pin clamps are pneumatically operated, wherein initial clamping of the pin clamps is performed at the initial station by pneumatic pressure. In order to maintain the precise positioning of the automobile body along the assembly line, the pin clamps at the four corners must typically remain clamped until assembly of the automobile body (often referred to as a "white body") is finished. However, once the initial components are positioned and welded at the initial station, pneumatic pressure is removed from the pin clamps so that the pallet can be transferred to subsequent welding and assembly stations. Pneumatic pressure is typically not reintroduced to the pin clamps until the white body is completely assembled, which is when the white body is unclamped from the pallet and ready for the subsequent assembly process. Conventionally, the white body is held in place by the clamping pins during the absence of pneumatic pressure via complex mechanical components within the clamping pin apparatus, such as cams, gears, or other mechanisms.

During initial setup and/or day-to-day operation in the assembly process, it is also sometimes necessary to modify an orientation of the pin clamps for various reasons, such as to permit access for robots to enter areas of the automobile body otherwise blocked by a pin clamp. Conventionally, a pin clamp is configured to be initially secured to the riser, whereby the orientation and referencing of the pin clamp with respect to the hardened steel position on the pallet is accurately measured. Conventional pin clamps have been provided that can clamp a workpiece with respect to a mounting surface of the pin clamp, or in a position that is 180-degrees opposed to the initial position. As such, when clamping is desired at positions other than the initial or 180-degree opposed position of the pin clamp, the riser is typically modified or changed, and the pallet is referenced again, at significant cost and consumption of time. Such a change can cause many problems, especially when a large number of pallets are involved (e.g., 800-1000 pallets are not uncommon in an assembly line). Furthermore, customized risers can be quite expensive, where the customized riser is designed to provide specialized location capabilities.

Further, in order to provide a rotation of 90 degrees in a conventional pin clamp, a time and cost-intensive reconfiguration of the fixture or pallet would typically be required. Conventionally, a riser is mounted to the pallet wherein a reconfiguration or rotation of the conventional pin clamp could require a different riser (e.g., a customized E-W replacing a N-S riser) to be placed on the pallet. Such a change can cause many problems when a large number of pallets are required. Customized risers are typically very expensive, where the riser is designed to provide specialized location capabilities. The present invention utilizes a standard riser North American Automotive Manufacturing (NAAM) riser.

SUMMARY

The present disclosure provides a novel sliding head locking pin clamp, wherein an orientation of a clamping member is configured to be readily adjustable in one of four 90-degree opposed positions. In accordance with on exemplary aspect, a sliding head locking pin clamp is provided having a housing with a housing bore extending axially therethrough along a first axis. An end cap has an end cap bore extending therethrough along the first axis, wherein the end cap is operably coupled to a first end of the housing.

According to one example, a shaft has a shaft bore extending through the shaft along the first axis, wherein an outer diameter of a first end of the shaft generally defines a first portion of a locating pin. The first portion of the locating pin is in axial sliding engagement with at least a first portion of the end cap bore. The shaft has a shaft hole extending radially through the shaft along a second axis, wherein the second axis is perpendicular to the first axis. The shaft further has a shaft guide rod generally fixedly positioned in the shaft hole.

A piston is further coupled to the shaft and is in sliding engagement with the housing bore to linearly translate the shaft between a first axial position and a second axial position along the first axis. A slider has a slider hole extending radially therethrough, wherein the shaft guide rod is in linear sliding engagement with the slider hole, therein providing a linear translation of the slider with respect to the shaft along the second axis between a first radial position and a second radial position. The slider has a rod member extending through a first end of shaft bore and comprising a tip having an engagement lip, wherein the tip of the rod member generally defines a second portion of the locating pin. A cam follower also extends radially from the slider.

A cam block has a cam block bore extending into the cam block along the first axis, wherein the cam block comprises a cam channel defined in a sidewall of the cam block bore. A portion of the slider is configured to reside within the cam block bore and wherein the cam follower is in sliding engagement with the cam channel. In the first axial position and first radial position, the first and second portions of the locating pin are configured to pass through a locating hole of a workpiece. In the second axial position and second radial position, the rod member is configured to clamp the workpiece between the engagement lip and the end cap. The first radial position and second radial position are governed by the sliding engagement between the shaft guide rod and the slider hole, and the sliding engagement between the cam follower and the cam channel upon the linear translation of the shaft between the first axial position and second axial position.

In accordance with another exemplary aspect, a check valve is associated with the housing, wherein the check valve is configured to selectively maintain a pneumatic pressure associated with one of a first axial side and a second axial side of the piston when a source of pneumatic pressure is removed from the one of the first axial side and second axial side of the piston.

DETAILED DESCRIPTION

Figure 1:
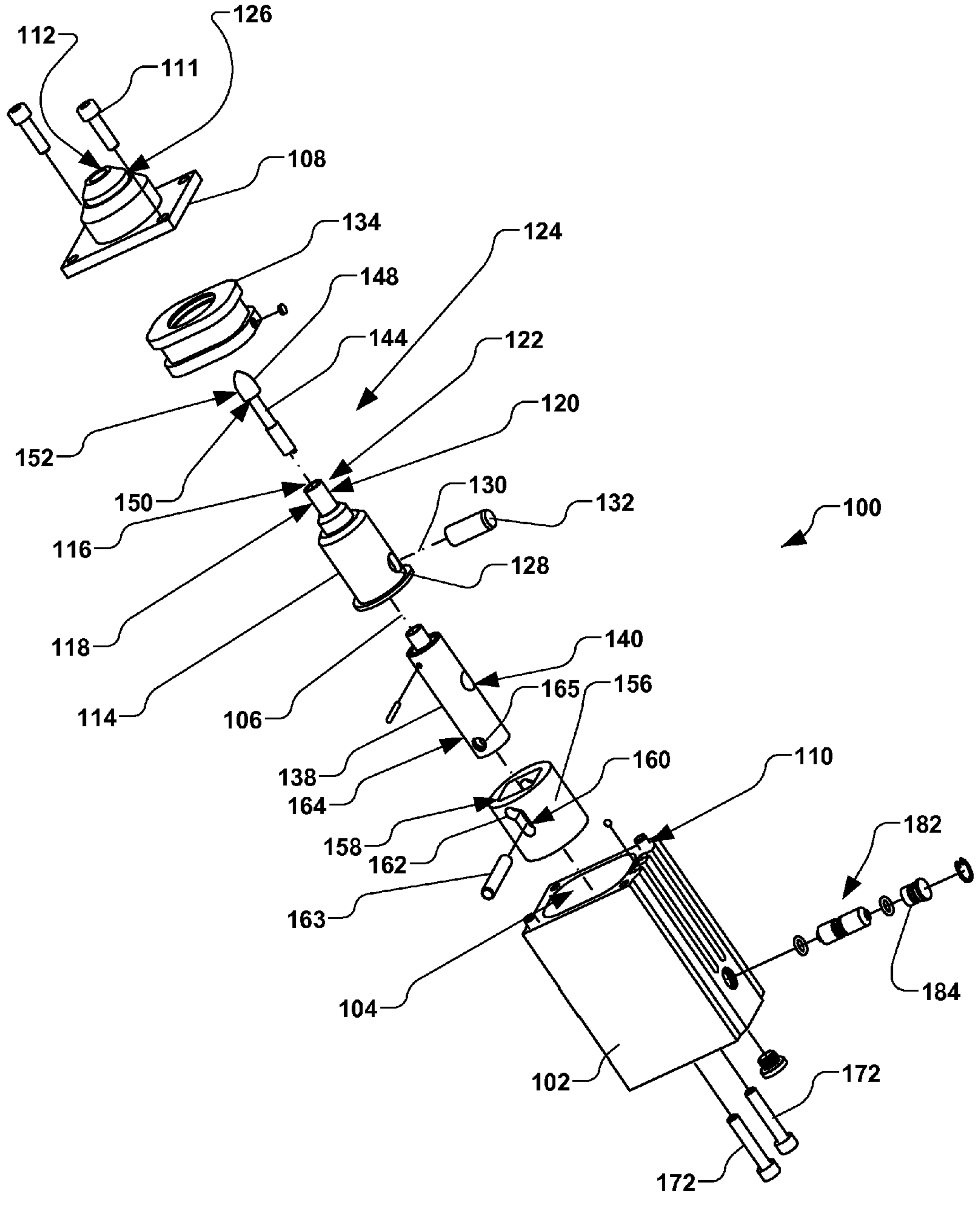
FIG. 1 is an exploded perspective view of an exemplary sliding head locking pin clamp in accordance with several aspects of the present disclosure.

The present disclosure will be described with reference to the drawings wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present disclosure. It will be evident to one skilled in the art, however, that the present disclosure may be practiced without these specific details. In other instances, well-known structures and devices are shown in block diagram form in order to facilitate description of the present disclosure.

Figure 2B:
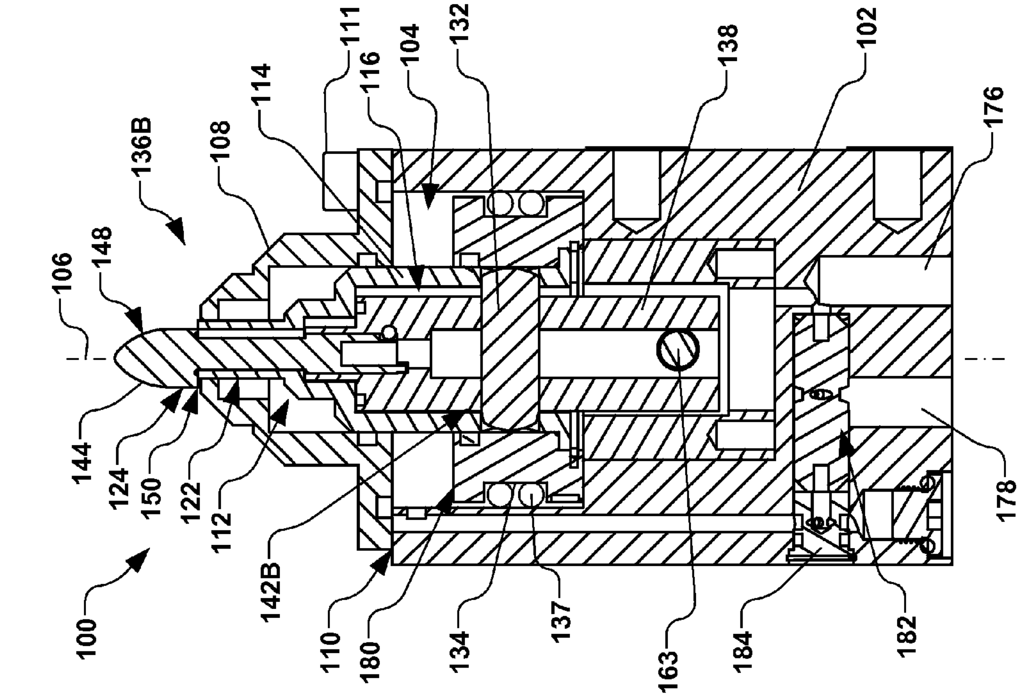
FIGS. 2A-2B illustrate cross-sectional views of an exemplary sliding head locking pin clamp in respective unclamped and clamped positions in accordance with another aspect.
Figure 2A:
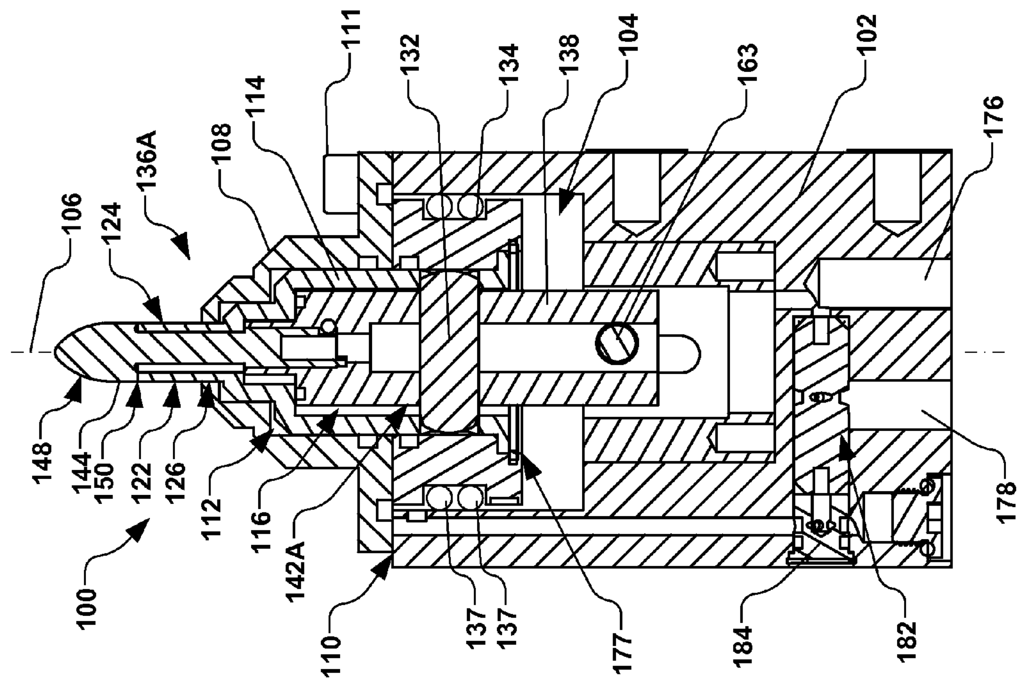
Figure 3A:
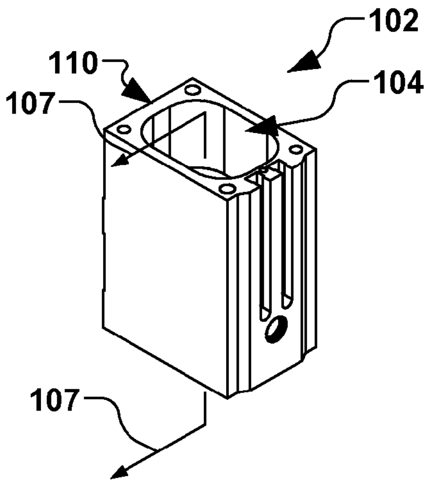
FIG. 3A-3B illustrate respective perspective and cross-sectional views of a housing according to another aspect.
Figure 3B:
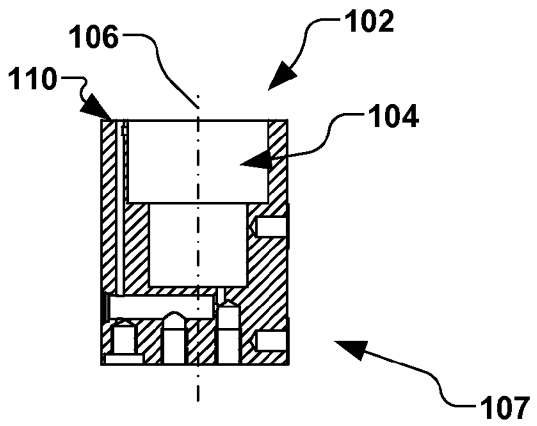
Figure 4A:
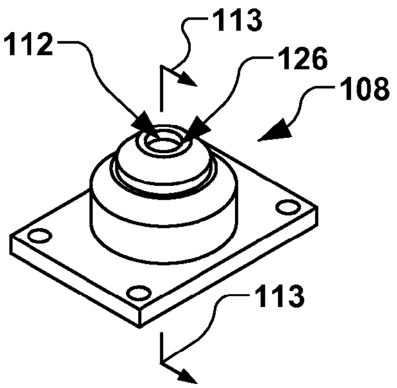
FIGS. 4A-4B illustrate respective top and bottom perspective views of an end cap in accordance with another exemplary aspect.
Figure 4B:
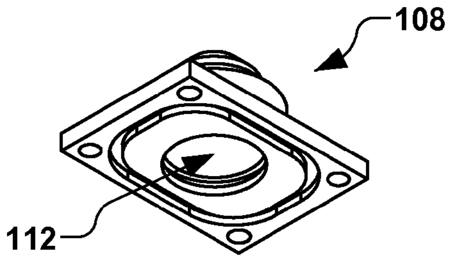
Figure 4C:
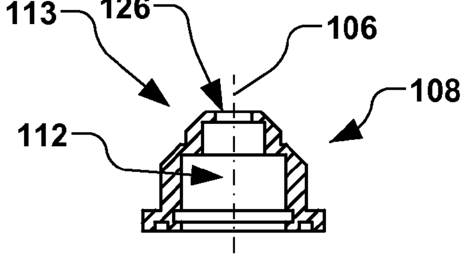
FIGS. 4C illustrates a cross-sectional view of the end cap of FIG. 4A-4B in accordance with another exemplary aspect.

Referring initially to FIGS. 1 and 2A-2B, a sliding head locking pin clamp 100 is provided in accordance with one exemplary aspect of the disclosure. In one example, a housing 102 is provided having a housing bore 104 extending axially into the housing, therein defining a first axis 106. The housing 102, for example, is illustrated in further detail FIGS. 3A-3B, wherein the housing bore 104 extends partially through the housing, as shown in section 107 of FIG. 3B. Although not shown, other configurations of the bore 104 are also contemplated, such as a bore extending through the housing 102, as will be understood by one of ordinary skill. As illustrated in FIGS. 1 and 2A-2B, an end cap 108 is further operably coupled to a first end 110 of the housing 102, such as by one or more fasteners 111 (e.g., screws, pins, or other fasteners). The end cap 108 comprises an end cap bore 112 extending therethrough, generally along the first axis 106. FIGS. 4A-4C, for example, illustrate the end cap 108 in greater detail, wherein the end cap bore 112 extends through the end cap, as can be seen in section 113 of FIG. 4C.

Figure 5A:
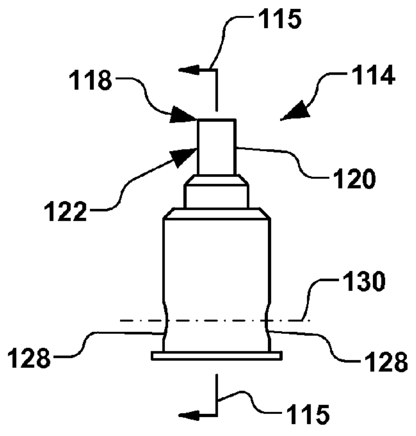
FIGS. 5A-5B illustrate respective front and cross-sectional views of a shaft in accordance with another aspect of the disclosure.
Figure 5B:
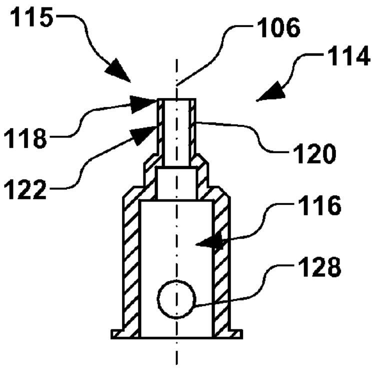

According to one example, a shaft 114 is provided in the sliding head locking pin clamp 100 shown in FIGS. 1 and 2A-2B. FIG. 5A, for example, illustrates the shaft 114, wherein section 115 is further illustrated in FIG. 5B, wherein the shaft is shown having a shaft bore 116 extending therethrough, generally along the first axis 106. A first end 118 of the shaft 114 has an outer diameter 120 generally defining a first portion 122 of a locating pin 124, as illustrated in FIGS. 1 and 2A-2B. The first portion 122 of the locating pin 124, for example, is in axial sliding engagement with at least a first portion 126 of the end cap bore 112, illustrated in FIGS. 4A and 4C. A shaft hole 128, illustrated in FIGS. 5A-5B, for example, is further provided in the shaft 114 and extends radially through the shaft along a second axis 130, wherein the second axis is generally perpendicular to the first axis 106, as illustrated in FIG. 1. The shaft 114, for example, further comprises a shaft guide rod 132 generally fixedly positioned in the shaft hole 128.

Figure 6A:
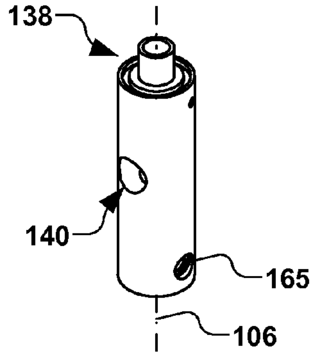
FIG. 6A illustrates a perspective view of an exemplary slider according to another exemplary aspect.
Figure 6B:
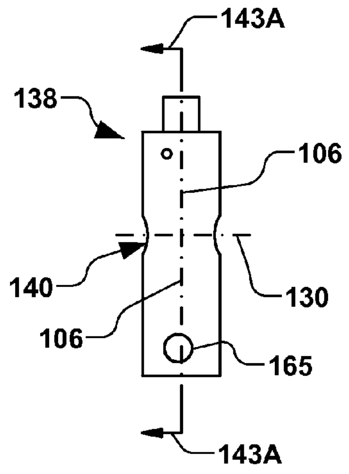
FIGS. 6B-6C illustrate respective side views of the slider of FIG. 6A according to another aspect.
Figure 6C:
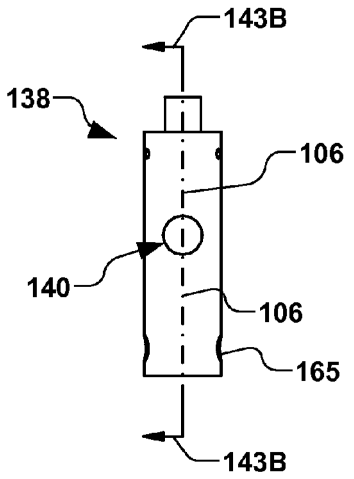
Figure 6D:
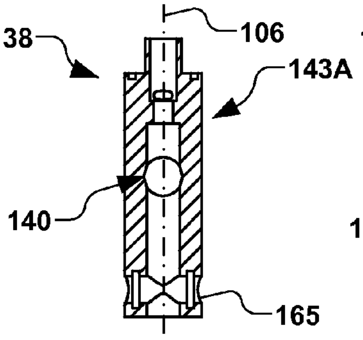
FIGS. 6D-6E illustrate respective cross-sectional views of the slider shown in FIGS. 6B-6C.
Figure 6E:
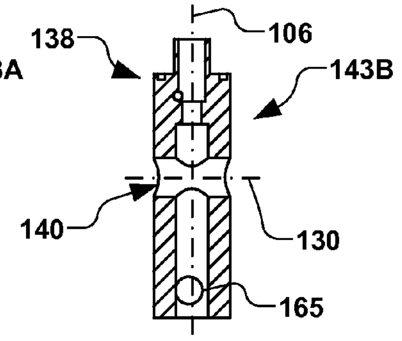

A piston 134, for example, is further generally fixedly coupled to the shaft 114. The piston 134, for example, is in sliding engagement with the housing bore 104 and configured to linearly translate the shaft 114 between a first axial position 136A and a second axial position 136B along the first axis 106, illustrated in cross-section in FIGS. 2A and 2B, respectively. One or more o-rings 137, for example, are further provided with the piston 134 for sealing the piston to the housing bore 104, as will be understood by one of ordinary skill. Referring again to FIG. 1, a slider 138 is further provided, wherein the slider comprises a slider hole 140 extending radially therethrough, as illustrated in greater detail in FIGS. 6A-6E. The slider hole 140, for example, is in linear sliding engagement with the shaft guide rod 132 of FIG. 1, therein providing a linear translation of the slider 138 with respect to the shaft 114 along the second axis 130 of FIG. 5A between a first radial position 142A and a second radial position 142B, illustrated again in FIGS. 2A-2B, respectively. Section 143A of FIG. 6D and section 143B of FIG. 6E further illustrate the slider 138 comprising the slider hole 140. One or more of the slider 138 and shaft guide rod 132 of FIG. 1, for example, may be hardened appropriately to minimize wear.

Figure 7A:
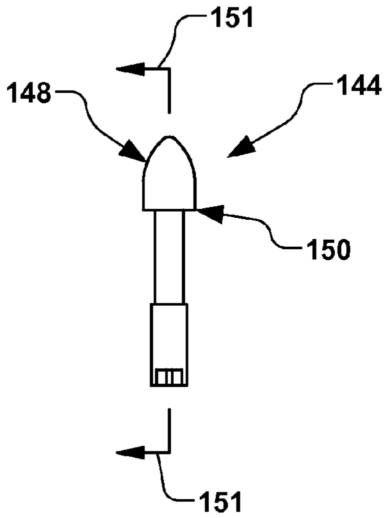
FIGS. 7A-7B illustrate respective side and cross-sectional views of a rod member in accordance with another exemplary aspect of the disclosure.
Figure 7B:
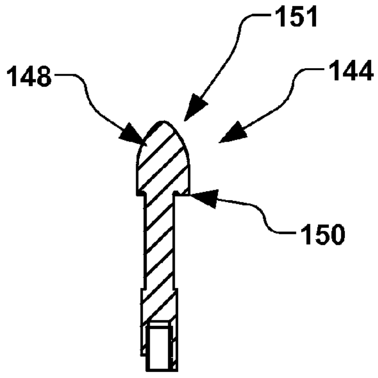

According to another example, as illustrated in FIGS. 1 and 2A-2B, a rod member 144 extends through the shaft bore 116 at the first end 118 of the shaft 114 and comprises a tip 148 having an engagement lip 150, as illustrated in greater detail in FIGS. 7A-7B, where FIG. 7B illustrates section 151 of FIG. 7A. The tip 148 of the rod member 144, for example, generally defines a second portion 152 of the locating pin 124, as illustrated in FIG. 1.

Figure 8A:
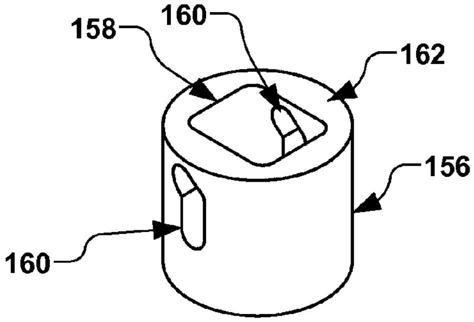
FIG. 8A illustrates a top perspective view of an exemplary cam block in accordance with yet another exemplary aspect.
Figure 8B:
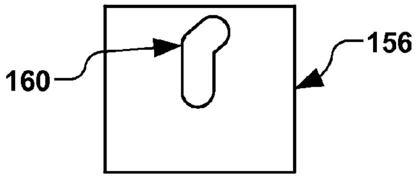
FIG. 8B illustrates a side view of the cam block of FIG. 8A.
Figure 8C:
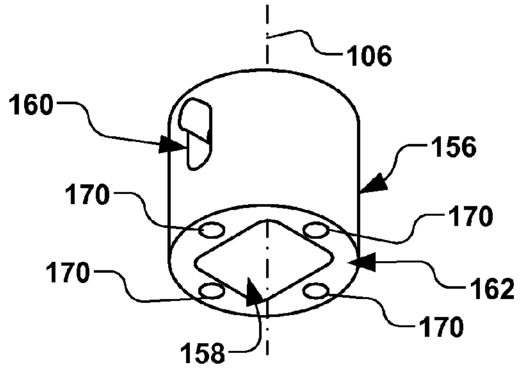
FIG. 8C illustrates a bottom perspective view of the cam block of FIG. 8A in accordance with another aspect.

A cam block 156 is further provided having a cam block bore 158 extending into the cam block generally along the first axis 106. The cam block 156 comprises at least one cam channel 160 defined in a sidewall 162 of the cam block bore 158, as illustrated in greater detail in FIGS. 8A-8C. At least one cam follower 163 further extends radially from the slider 138 of FIG. 1, wherein a portion 164 of the slider 138 is thus configured to reside within the cam block bore 158, and wherein the at least one cam follower 163 is in sliding engagement with the at least one cam channel 160. For example, one cam follower 163 is pressed into a hole 165 in the slider, wherein the cam follower 163 is configured to travel within the two cam channels 160 provided in FIG. 8A.

Figure 9A:
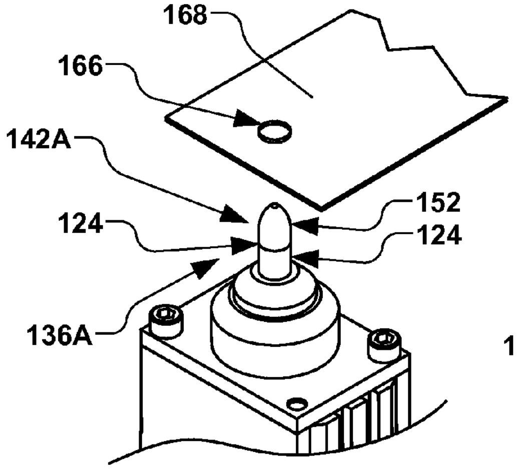
FIGS. 9A-9D illustrate perspective views of a sliding head locking pin clamp in various stages of clamping a workpiece in accordance with another aspect.
Figure 9B:
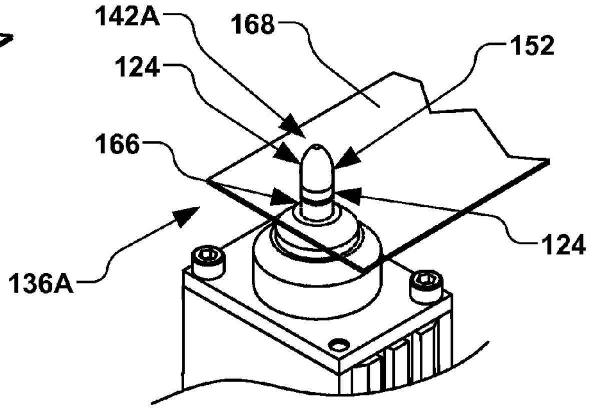

Accordingly, in the first axial position 136A and first radial position 142A of FIG. 2A, for example, the first portion 122 and second portion 152 of the locating pin 124 are configured to pass through a locating hole 166 of a workpiece 168, as illustrated in FIGS. 9A-9B. In the second axial position 136B and second radial position 142B of FIG. 2B, for example, the rod member 144 is configured to clamp the workpiece 168 between the engagement lip 150 and the end cap 108, as illustrated in FIG. 9D. The first radial position 142A of FIGS. 9A-9C and second radial position 142B of FIG. 9D, for example, are generally governed by the sliding engagement between the shaft guide rod 132 and the slider hole 140 and the sliding engagement between the cam follower 163 coupled to the slider 138 and the cam channel 160 of the cam block 156 upon the linear translation of the shaft 114 (coupled to the piston 134) between the first axial position 136A of FIGS. 2A and 9A-9C and second axial position 136B of FIGS. 2B and 9D.

Figure 9C:
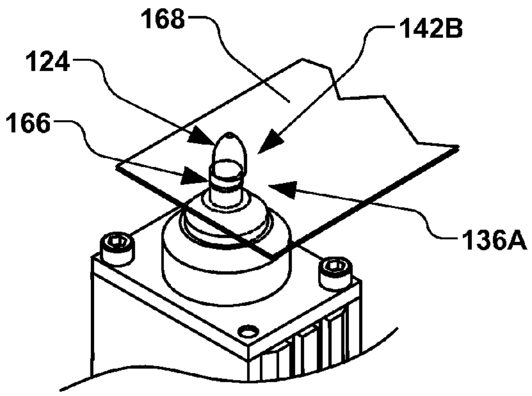
Figure 9D:
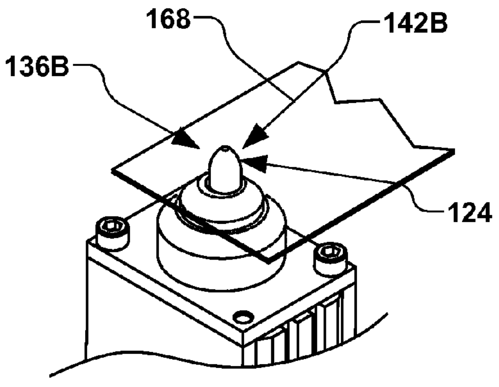
Figure 10A:
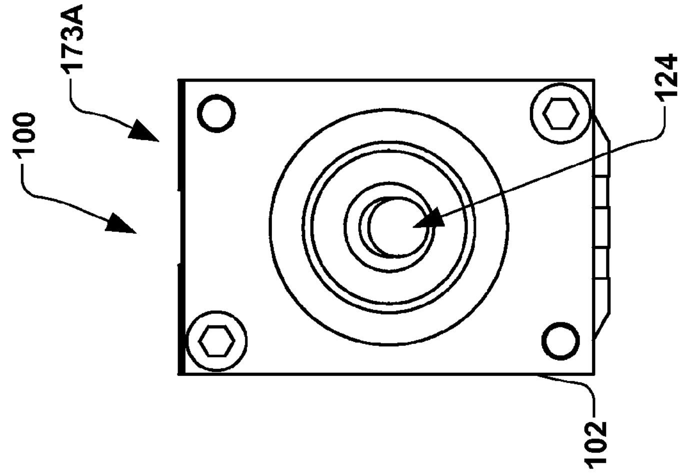
FIGS. 10A-10D illustrate an exemplary sliding head locking pin clamp in respective 90-degree offset positions, in accordance with still another aspect.
Figure 10B:
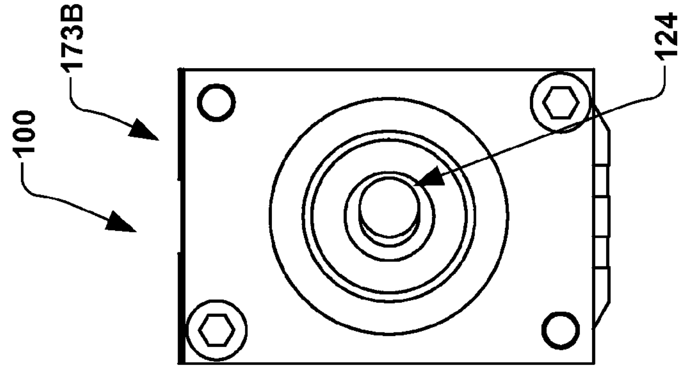
Figure 10C:
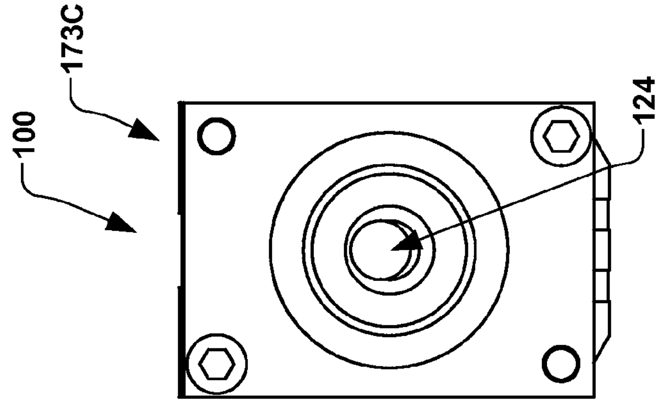
Figure 10D:
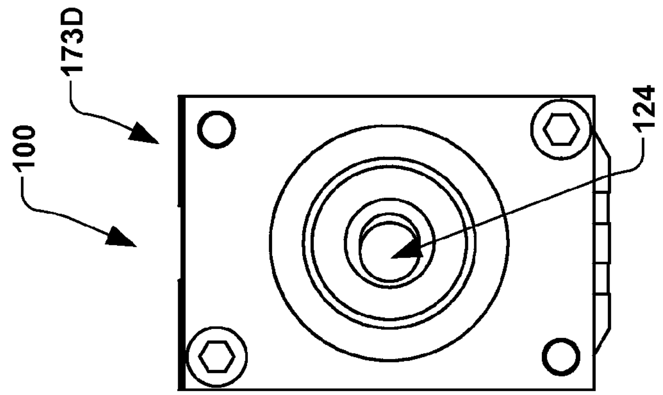

It is noted that the at least one cam channel 160 of the cam block 156 of FIGS. 1 and 8A-8C, for example, further allow at least a portion of the locating pin 124 to first translate perpendicularly to the first axis 106, as illustrated in the intermediate position of FIG. 9C, and then to translate along the first axis to the position shown in FIG. 9D.

In accordance with another exemplary aspect of the disclosure, it is understood that order to provide a rotation of 90 degrees in a conventional pin clamp, a time and cost-intensive reconfiguration of the fixture or pallet would typically be required. Conventionally, a riser is mounted to the pallet wherein a reconfiguration or rotation of the conventional pin clamp could require a different riser (e.g., a customized E-W replacing a N-S riser) to be placed on the pallet. Such a change can cause many problems when a large number of pallets are required. Customized risers are typically very expensive, where the riser is designed to provide specialized location capabilities.

Figure 11:
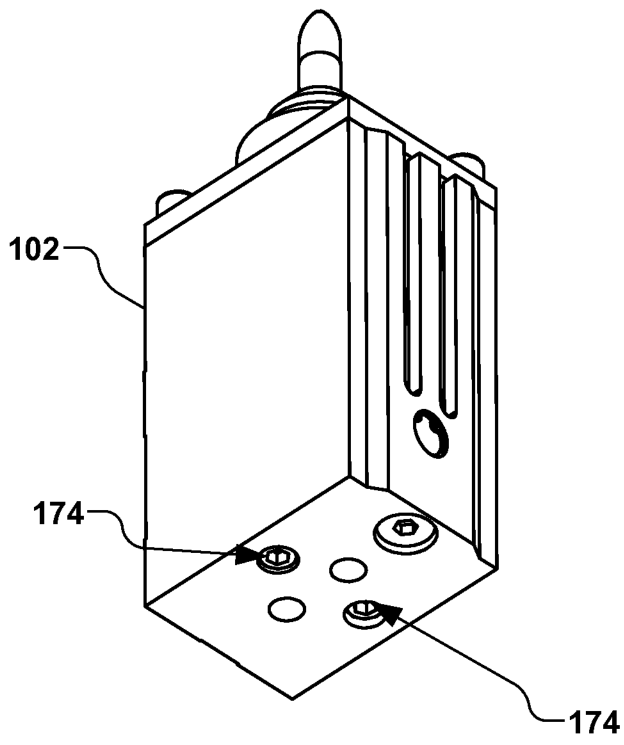
FIG. 11 illustrates a bottom perspective view of the sliding head locking pin clamp of FIG. 1 in accordance with still another aspect of the disclosure.

The present invention provides 90 degrees of rotation for the pin clamp 100 (e.g., South, East, North, and West, as illustrated in FIGS. 10A-10D, respectively) for selectively translation of the tip 148 locating pin 124 in the desired direction. Thus, the present disclosure can advantageously utilize a standard riser North American Automotive Manufacturing (NAAM) riser without having to unnecessarily modify the riser. For example, the cam block 156 of FIG. 8C further comprises four mounting holes 170 extending generally parallel to the axis 106 into the cam block. The mounting holes 170, for example, are threaded to selectively couple the cam block 156 to the housing 102 of FIGS. 1 and 2A-2B in one of the four 90-degree-opposed positions 173A-173D illustrated in FIGS. 10A-10D. For example, the cam block 156 is mounted to the housing 102 via a selective threaded engagement of two screws 172 of FIG. 1 passing through two holes 174 in the housing illustrated in FIG. 11, wherein the two screws thread into an opposing two of the four mounting holes 170 in the cam block of FIG. 8C. Accordingly, four 90-degree-opposed positions 173A-173D of the locating pin 124 with respect to the housing 102, as illustrated in FIGS. 10A-10D. It is to be understood that while four mounting holes 170 are provided in the present example, any number of mounting holes may be provided in the cam block 156, therein providing a myriad of distinct radial positions 173 of the locating pin 124 with respect to the housing 102. For example, six mounting holes 170 may be provided in six 60-degree opposed positions (not shown), thus enabling six different orientations of the locating pin 124 with respect to the housing 102.

In one example of the present disclosure, in order to change direction of clamping of the pin clamp 100 illustrated in FIGS. 10A-10D, the two screws 172 of FIG. 1 retaining the cam block 156 are removed, the cam block is rotated to the desired position, and then the screws are again fastened to the cam block. Such an operation can be performed quickly (e.g., less than approximately 5 minutes).

In accordance with another example, a position sensor (not shown) is operably coupled to the housing 102, wherein the position sensor is configured to sense a position of the piston 134 with respect to the housing.

According to another example, as illustrated in FIGS. 2A-2B, the pin clamp 100 can further comprise a first port 176 associated with a first axial side 177 of the piston 134, a second port 178 associated with a second axial side 180 of the piston, and a check valve 182, wherein the check valve is configured to selectively maintain a pneumatic pressure associated with one or more of the first axial side and second axial side when a source of pneumatic pressure is removed from one or more of the first port and second port. The housing 102, for example, can comprise one or more passages defined therein, wherein the one or more passages define a pneumatic circuit coupling the first port 176, second port 178, check valve 182, a check valve spacer 184 and the housing bore 104. The check valve 182, for example, may be pilot-operated.

In another example, the present invention maintains clamping force on the workpiece via the pilot-operated check valve 182 that is integrated into the pin clamp 100. The pilot-operated check valve 182 is thus embedded in the pin clamp 100, wherein any pressure held by the pilot-operated check valve is retained in a volume within the housing 102 of the pin clamp. Pneumatic pressure that is applied to the pin clamp 100 (e.g., approximately 80 psi) is retained by the pilot-operated check valve 182. In the present embodiment, the pin clamp 100 is configured to clamp down onto a workpiece (e.g., the white body) with approximately 300 pounds of force, but greater or lesser clamping forces are contemplated. In a conventional clamp, if a catastrophic force, such as a robot accidentally colliding with the workpiece, the conventional pin clamps could potentially be moved a little bit. However, as soon as the catastrophic force ends, the pin clamp would go back to its original clamping.

In the present example, since the pin clamp 100 is pilot-operated, when the clamping is released by pressure on an opposing port, the clamp disengages the workpiece. The check valve 182 generally holds the pneumatic pressure in the cylinder, whereas in conventional pin clamps, the pressure in the cylinder can be compressed (e.g., the piston can move) based on how much force is applied. Alternatively, many complex mechanisms have been used to lock the pin in place, where the number of parts can go up to 50 parts. Since MTBF is halved each time you add a part, every additional part added can decrease the life expectancy of the pin clamp. On the contrary, the present invention has very few parts, is relatively simple, has a lower cost, and significantly higher reliability than conventional pin clamps.

The circuitry for the pilot-operated check valve, for example, is integral to the body or housing 102 of the pin clamp 100. In one example, all pneumatic circuitry is internal to the housing 102, wherein porting goes through the body. In one example, a conventional pilot-operated check valve 182 is provided in the housing 102, wherein a circlip retains the valve in the housing. Porting can be drilled or otherwise machined into the housing, wherein a ball can be pressed into the housing to seal a hole. Further, porting to a pneumatic source can be provided on any side of the housing, wherein the pneumatic circuitry can be sealed by a pipe plug.

Another option for the pilot operated check valve is to place the check valve 182 in a valve stack (not shown) external to the pin clamp 100. Preferably, however, the check valve 182 is integral to the housing, which can be formed from a solid piece of aluminum, An external valve and/or seals could fail if the check valve were in the valve stack, so the check valve being integral to the body is preferable.

During clamping, the pilot operated check valve provides pneumatic pressure through a first port (e.g., at a first end of the cylinder) and the pneumatic pressure forces the piston one direction to clamp the locating pin, and the pressure is contained in the cylinder until another port is actuated by pneumatic force. To unclamp, pneumatic pressure is provided to the opposite end of the cylinder, wherein the pneumatic pressure is also directed to a third port associated with the check valve. The check valve thus disables the check port, and the air can return. The check valve is generally transparent (e.g., not seen) by the end user, and thus, exposure of any external circuitry is minimized. In the present disclosure, said circuitry is integral to the valve and housing of the pin clamp, thus further not necessitating additional parts.

Although the disclosure has been shown and described with respect to certain aspects, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary aspects of the disclosure. In addition, while a particular feature of the invention may have been disclosed with respect to only one of several aspects, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed:

1. A sliding head locking pin clamp, comprising:

a housing having a housing bore extending axially into the housing, therein defining a first axis;

an end cap having an end cap bore extending therethrough along the first axis, wherein the end cap is operably coupled to a first end of the housing;

a shaft, comprising:

- a shaft bore extending through the shaft along the first axis;
- an outer diameter of a first end of the shaft generally defining a first portion of a locating pin, wherein the first portion of the locating pin is in axial sliding engagement with at least a first portion of the end cap bore;
- a shaft hole extending radially through the shaft along a second axis, wherein the second axis is perpendicular to the first axis; and
- a shaft guide rod generally fixedly positioned in the shaft hole;

a piston generally fixedly coupled to the shaft, wherein the piston is in sliding engagement with the housing bore and configured to linearly translate the shaft between a first axial position and a second axial position along the first axis;

a slider, comprising:

- a slider hole extending radially therethrough, wherein the shaft guide rod is in linear sliding engagement with the slider hole, therein providing a linear translation of the slider with respect to the shaft along the second axis between a first radial position and a second radial position;
- a rod member extending through a first end of shaft bore and comprising a tip having an engagement lip, wherein the tip of the rod member generally defines a second portion of the locating pin; and
- a cam follower extending radially from the slider; and a cam block having a cam block bore extending into the cam block along the first axis, wherein the cam block comprises a cam channel defined in a sidewall of the cam block bore, wherein a portion of the slider is configured to reside within the cam block bore and wherein the cam follower is in sliding engagement with the cam channel, and wherein, in the first axial position and first radial position, the first and second portions of the locating pin are configured to pass through a locating hole of a workpiece, wherein in the second axial position and second radial position, the rod member is configured to clamp the workpiece between the engagement lip and the end cap, and wherein the first radial position and second radial position are generally governed by the sliding engagement between the shaft guide rod and the slider hole and the sliding engagement between the cam follower and the cam channel upon the linear translation of the shaft between the first axial position and second axial position.

2. The sliding head locking pin clamp of claim 1, wherein the cam block further comprises four mounting holes extending generally parallel to the first axis into the cam block, wherein the cam block is selectively coupled to the housing in one of four 90-degree-opposed positions with respect to the housing via a selective threaded engagement of two screws passing through two holes in the housing and an opposing two of the four mounting holes in the cam block, therein selectively providing four 90-degree-opposed positions of the locating pin with respect to the housing.

3. The sliding head locking pin clamp of claim 1, further comprising a position sensor operably coupled to the housing, wherein the position sensor is configured to sense a position of the piston with respect to the housing.

4. The sliding head locking pin clamp of claim 1, wherein the housing further comprises:

a first port associated with a first axial side of the piston;

a second port associated with a second axial side of the piston; and a check valve, wherein the check valve is configured to selectively maintain a pneumatic pressure associated with one or more of the first axial side and second axial side when a source of the pneumatic pressure is removed from one or more of the first port and second port.

5. The sliding head locking pin clamp of claim 4, wherein the housing comprises one or more passages defined therein, wherein the one or more passages define a pneumatic circuit coupling the first port, second port, check valve, and the housing bore.

6. A sliding head locking pin clamp, comprising:

a housing having a housing bore extending axially therethrough, therein defining a first axis;

an end cap having an end cap bore extending therethrough along the first axis, wherein the end cap is operably coupled to a first end of the housing;

a shaft, comprising:

a shaft bore extending through the shaft along the first axis;

an outer diameter of a first end of the shaft generally defining a first portion of a locating pin, wherein the first portion of the locating pin is in axial sliding engagement with at least a first portion of the end cap bore; and a shaft guide rod extending radially along a second axis that is perpendicular to the first axis;

a piston coupled to the shaft, wherein the piston is in sliding engagement with the housing bore and configured to linearly translate the shaft between a first axial position and a second axial position along the first axis;

a slider, comprising:

a slider hole extending radially therethrough, wherein the shaft guide rod is in linear sliding engagement with the slider hole, wherein the slider is configured to linearly translate with respect to the shaft along the second axis between a first radial position and a second radial position;

a rod member extending through a first end of shaft bore and comprising a tip having an engagement lip, wherein the tip of the rod member generally defines a second portion of the locating pin; and a cam follower extending radially from the slider; and a cam block having a cam block bore extending into the cam block along the first axis, wherein the cam block comprises at least one cam channel defined in a sidewall of the cam block bore, wherein a portion of the slider is configured to reside within the cam block bore and wherein the cam follower is in sliding engagement with the cam channel, wherein, in the first axial position and first radial position, the first and second portions of the locating pin are configured to pass through a locating hole of a workpiece, wherein in the second axial position and second radial position, the rod member is configured to clamp the workpiece between the engagement lip and the end cap, and wherein the first radial position and second radial position are generally governed by the sliding engagement between the shaft guide rod and the slider hole and the sliding engagement between the cam follower and the at least one cam channel upon the linear translation of the shaft between the first axial position and second axial position.

7. The sliding head locking pin clamp of claim 6, wherein the shaft comprises a shaft hole extending radially through the shaft along the second axis, and wherein the shaft guide rod is generally fixedly positioned in the shaft hole.

8. The sliding head locking pin clamp of claim 6, wherein the cam block comprises two cam channels defined in respective opposing sidewalls of the cam block bore, and wherein the cam follower extends radially from opposing sides of the slider, wherein the cam follower is in sliding engagement with the two cam channels.

9. The sliding head locking pin clamp of claim 6, wherein the cam block further comprises a plurality of mounting holes extending generally parallel to the first axis into the cam block, wherein the cam block is selectively coupled to the housing via a selective threaded engagement of two screws passing through two holes in the housing and into an opposing two of the plurality of mounting holes in the cam block, therein selectively providing a plurality of radially-distinct positions of the locating pin with respect to the housing.

10. The sliding head locking pin clamp of claim 9, wherein the cam block comprises four mounting holes, therein defining four 90-degree opposed positions of the cam block with respect to the housing.

11. The sliding head locking pin clamp of claim 6, further comprising a position sensor operably coupled to the housing, wherein the position sensor is configured to sense a position of the piston with respect to the housing.

12. The sliding head locking pin clamp of claim 6, wherein the housing further comprises:

a first port associated with a first axial side of the piston;

a second port associated with a second axial side of the piston; and a check valve, wherein the check valve is configured to selectively maintain a pneumatic pressure associated with one or more of the first axial side and second axial side when a source of the pneumatic pressure is removed from one or more of the first port and second port, therein maintaining the workpiece in clamped position.

13. The sliding head locking pin clamp of claim 6, wherein the housing comprises one or more passages defined therein, wherein the one or more passages define a pneumatic circuit coupling the first port, second port, check valve, and the housing bore.

14. A sliding head locking pin clamp, comprising:

a housing having a housing bore extending axially therethrough, therein defining a first axis;

an end cap having an end cap bore extending therethrough along the first axis, wherein the end cap is operably coupled to a first end of the housing;

a shaft, comprising:

a shaft bore extending through the shaft along the first axis;

an outer diameter of a first end of the shaft generally defining a first portion of a locating pin, wherein the first portion of the locating pin is in axial sliding engagement with at least a first portion of the end cap bore; and a shaft guide rod extending radially along a second axis that is perpendicular to the first axis;

a piston coupled to the shaft, wherein the piston is in sliding engagement with the housing bore and configured to linearly translate the shaft between a first axial position and a second axial position along the first axis;

a slider, comprising:

a slider hole extending radially therethrough, wherein the shaft guide rod is in linear sliding engagement with the slider hole, wherein the slider is configured to linearly translate with respect to the shaft along the second axis between a first radial position and a second radial position;

a rod member extending through a first end of shaft bore and comprising a tip having an engagement lip, wherein the tip of the rod member generally defines a second portion of the locating pin; and a cam follower extending radially from the slider; and a cam block having a cam block bore extending into the cam block along the first axis, wherein the cam block comprises at least one cam channel defined in a sidewall of the cam block bore, wherein a portion of the slider is configured to reside within the cam block bore and wherein the cam follower is in sliding engagement with the cam channel, and wherein the cam block further comprises at least four mounting holes extending generally parallel to the first axis into the cam block, wherein the cam block is selectively coupled to the housing via a selective threaded engagement of two screws passing through two holes in the housing and an opposing two of the at least four mounting holes in the cam block, therein selectively providing at least four radially-distinct positions of the locating pin with respect to the housing, and wherein, in the first axial position and first radial position, the first and second portions of the locating pin are configured to pass through a locating hole of a workpiece, wherein in the second axial position and second radial position, the rod member is configured to clamp the workpiece between the engagement lip and the end cap, and wherein the first radial position and second radial position are generally governed by the sliding engagement between the shaft guide rod and the slider hole and the sliding engagement between the cam follower and the at least one cam channel upon the linear translation of the shaft between the first axial position and second axial position.

15. The sliding head locking pin clamp of claim 14, wherein the cam block comprises four mounting holes, therein defining four 90-degree opposed positions of the cam block with respect to the housing.

16. The sliding head locking pin clamp of claim 14, further comprising a position sensor operably coupled to the housing, wherein the position sensor is configured to sense a position of the piston with respect to the housing.

17. The sliding head locking pin clamp of claim 14, wherein the housing further comprises:

a first port associated with a first axial side of the piston;

a second port associated with a second axial side of the piston; and a check valve, wherein the check valve is configured to selectively maintain a pneumatic pressure associated with one or more of the first axial side and second axial side when a source of the pneumatic pressure is removed from one or more of the first port and second port, therein maintaining the workpiece in clamped position.

18. The sliding head locking pin clamp of claim 14, wherein the housing comprises one or more passages defined therein, wherein the one or more passages define a pneumatic circuit coupling the first port, second port, check valve, and the housing bore.

* * * * *